(No Model.)  2 Sheets—Sheet 1.

J. F. ROSS.
SOLDERING MACHINE.

No. 356,730.  Patented Jan. 25, 1887.

Witnesses.
F. B. Fetherstonhaugh
J. M. Jackson

Inventor:
J. F. Ross
by Donald C. Ridout
Atty (No Model.)　　　　　　　　　　　　　　　　　　2 Sheets—Sheet 2.
J. F. ROSS.
SOLDERING MACHINE.

No. 356,730.　　　　　　　　　　　Patented Jan. 25, 1887.

Witnesses.　　　　　　　　　　Inventor.

UNITED STATES PATENT OFFICE.

JOHN F. ROSS, OF TORONTO, ONTARIO, CANADA.

SOLDERING-MACHINE.

SPECIFICATION forming part of Letters Patent No. 356,730, dated January 25, 1887.

Application filed June 17, 1886. Serial No. 205,444. (No model.)

*To all whom it may concern:*

Be it known that I, JOHN FORSTER ROSS, of the city of Toronto, in the county of York, in the Province of Ontario, Canada, merchant, have invented a certain new and useful Soldering-Machine, of which the following is a specification.

The object of the invention is to design a machine in which soldering may be done with great rapidity by unskilled labor; and it consists, essentially, of one or more basins designed to hold the solder, which is kept in a liquid condition by heat applied to the basin, one or more soldering-irons being provided for each basin, the said soldering-irons being preferably pivoted so that their pressure against the article being soldered may be easily regulated by a weight or spring, the soldering end of the iron being partially immersed in the liquid solder, so as to derive a constant supply therefrom to apply onto the surface of the article pressed against and moving past the point of the soldering-iron, the whole being constructed and operated substantially as hereinafter more particularly explained.

Figure 1:
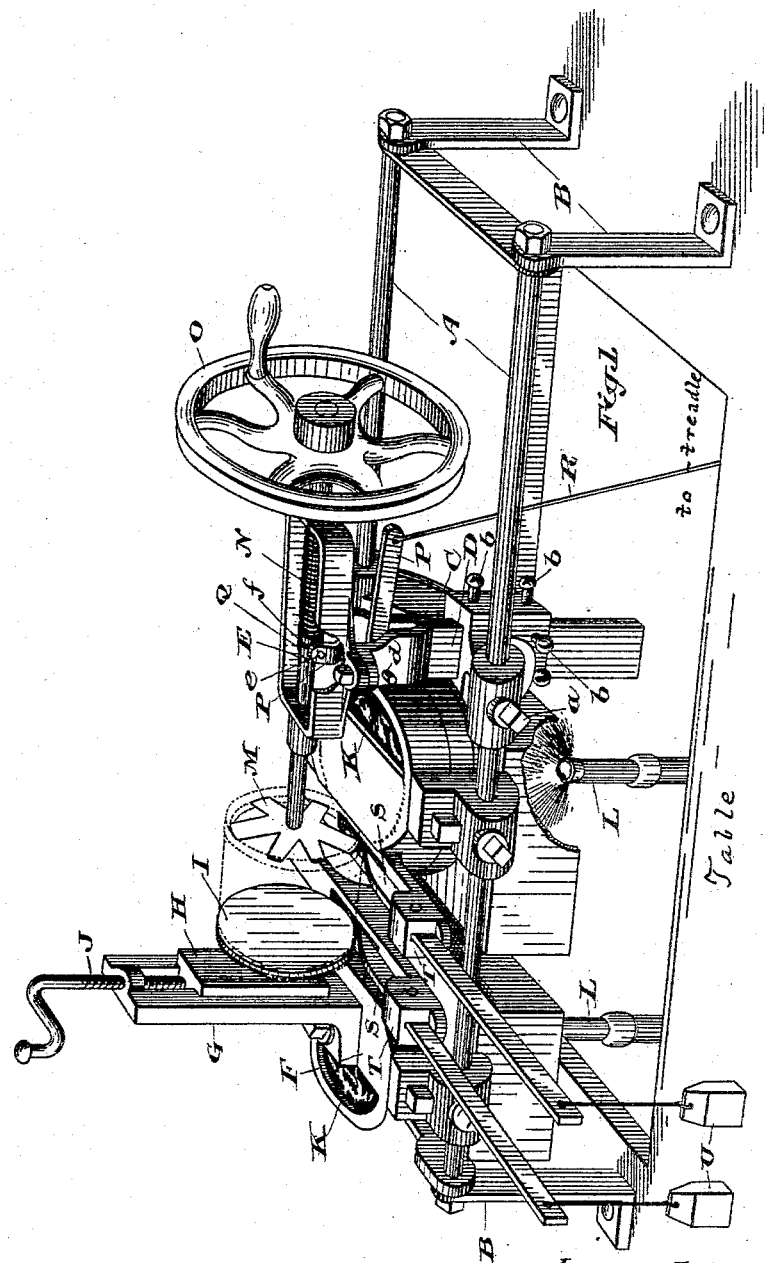
Figure 2:
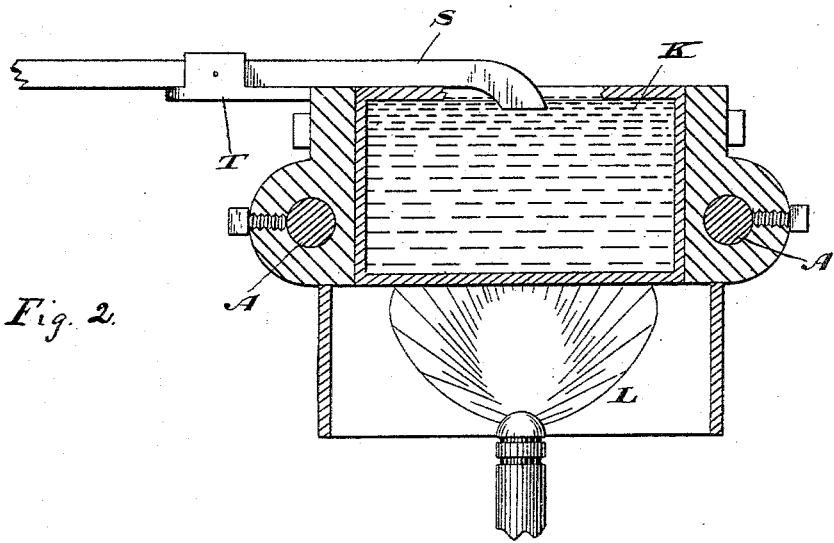

Figure 1 is a perspective view of a machine designed in accordance with my invention to solder cylindrical work. Fig. 2 is a sectional detail of the basin.

A represents two parallel rods supported by suitable end brackets, B. These rods are rigidly held in position and form the main frame of the machine.

C is a cross-head, sleeved on the rods A so that it can be adjusted longitudinally thereon and held in any desired position by the set-screws *a*. A vertical passage-way in the center of the cross-head C is designed to receive the shank D, on the upper end of which the bearing-boxes for the spindle E are formed. The shank D may be adjusted vertically in its cross-head C, and held in any desired position by the set-screws *b*. This provision for adjustment is intended for the purpose of enabling the machine to be used for the purpose of soldering cylinders of various diameters and lengths, the cross-head C being horizontally adjusted to suit the length of the cylinder, and the shank D vertically adjusted to suit any change in the diameter.

A cross-head, F, is secured to the rods A in the same manner as the cross-head C, and may be likewise horizontally adjusted. A bracket, G, is fastened to the cross-head F, and is provided with a sliding plate, H, on which the face-plate I, for carrying one end of the cylinder, is journaled. This sliding plate H may be raised or lowered by the screw J, so that the face-plate I may be altered to suit any change in the vertical position of the spindle E.

K are basins, secured to the rods A in the same manner as the cross-heads C and F, so that they may be adjusted horizontally. Immediately below each basin K, I place a gas-jet, L, so as to supply the heat necessary to keep the solder within the basin K in a liquid condition.

On the end of the spindle E, I attach a spring-spider, M, designed to fit within and against the end of the cylinder being soldered. The face-plate I is made to fit the other end, and the spring N is designed to act on the spindle E, so as to press the spring-spider M against the end of the object it is fitting against. The said cylindrical object may be readily revolved by imparting the necessary motion to the spindle E, which may be done through the wheel O, fastened to the spindle E, and capable of being driven either by hand or mechanical power.

A bell-crank, P, is pivoted at *d*, below the spindle E, to which it is connected by means of a pin or pins, *e*, projecting inwardly from the forked end of the crank P, and fitting into an annular groove, *f*, made in the collar Q, attached to the spindle E, as indicated. This bell-crank P is provided for the purpose of throwing back the spindle E, so as to permit the removal or the insertion of the cylinder which has been or is to be soldered.

The simplest way of operating the bell-crank P is to attach a foot-lever to the end of the rod R. The soldering-irons S are pivoted on the brackets T, and their points are suspended over the solder contained in the basins, K. The weights U are placed for the purpose of imparting an upward movement to the soldering ends of the irons S.

Having now described the general construction of my soldering-machine, I may state, in explanation of its operation, that the can or other cylindrical article to be soldered is placed on the face-plate I, and its other end supported by the spring-spider M, the machine being adjusted, in the manner hereinbefore described, so that the seams to be soldered shall press against the points of the soldering-irons S, which being partially immersed in the liquid solder supply the requisite solder to the seam as the can is revolved by means of the wheel O. The weights U hold the soldering-irons S against the seams with sufficient pressure to accomplish the desired end.

Owing to the rapidity with which the cans or other cylindrical articles being soldered can be removed from the machine, and the fact that the soldering-irons S are furnished with a constant supply of solder, a very large number of cans can be soldered by my machine, and as it is so simple in construction a boy or unskilled laborer is able to operate it.

What I claim as my invention is—

1. The combination, with the parallel rods and basin adjustable longitudinally on said rods, of a cross-head longitudinally adjustable on said rods, a vertically-adjustable spindle on said cross-head, and a spider carried by said spindle, substantially as described.

2. The cross-head C, adjustably supported upon and connected to the parallel rods A, in combination with the shank D, connected to the cross-head C and supporting the spindle E, and the spider M, substantially as and for the purpose specified.

3. The cross-head C, adjustably supported on and connected to the parallel guide-rods A, combined with the shank D, connected to the cross-head C, the spindle E, supported by said shank, and the spring-actuated spider M on said spindle, substantially as described.

4. The combination, with the parallel rods A, of the cross-head C, adjustably supported by said rods, the shank D, vertically adjustable in said cross-head, the longitudinally-movable spindle and spider carried by said shank, and the vertically-adjustable face-plate I, substantially as described.

Toronto, June 4, 1886.

JOHN F. ROSS.

In presence of—
CHARLES C. BALDWIN,
ALICE K. THOMPSON.